United States Patent
Sanderson

(10) Patent No.: US 12,044,507 B2
(45) Date of Patent: Jul. 23, 2024

(54) COMPONENT PACKAGING FOR CENTRALLY OBSCURED OPTICAL SYSTEM

(71) Applicant: Raytheon Company, Waltham, MA (US)

(72) Inventor: Thomas Sanderson, Sahuarita, AZ (US)

(73) Assignee: Raytheon Company, Tewksbury, MA (US)

( * ) Notice: Subject to any disclaimer, the term of this patent is extended or adjusted under 35 U.S.C. 154(b) by 198 days.

(21) Appl. No.: 17/405,260

(22) Filed: Aug. 18, 2021

(65) Prior Publication Data

US 2023/0058098 A1    Feb. 23, 2023

(51) Int. Cl.
*F41G 7/22* (2006.01)
*G02B 17/06* (2006.01)

(52) U.S. Cl.
CPC ......... *F41G 7/2293* (2013.01); *F41G 7/2253* (2013.01); *G02B 17/061* (2013.01); *G02B 17/0684* (2013.01)

(58) Field of Classification Search
CPC .............. F41G 7/22–28; G02B 17/061; G02B 17/0684
See application file for complete search history.

(56) References Cited

U.S. PATENT DOCUMENTS

| | | | | |
|---|---|---|---|---|
| 3,323,757 A | | 6/1967 | Cole | |
| 3,372,556 A | * | 3/1968 | Waldman | F41G 7/2293 62/51.2 |
| 3,455,243 A | * | 7/1969 | Alphonse | F41G 7/2246 102/213 |
| 3,791,713 A | * | 2/1974 | Mackay | G02B 17/061 359/430 |
| 3,954,228 A | * | 5/1976 | Davis, Jr. | F41G 7/2293 250/203.2 |
| 4,013,245 A | * | 3/1977 | Vanbuskirk | F41G 7/222 244/3.21 |
| 4,093,154 A | * | 6/1978 | McLean | F41G 7/2253 250/203.1 |
| 4,123,134 A | * | 10/1978 | Meyers | G01S 3/7864 250/347 |

(Continued)

FOREIGN PATENT DOCUMENTS

CN    205643758 U    10/2016
DE    102007030880 A1    1/2009

(Continued)

OTHER PUBLICATIONS

International Search Report Dated Mar. 14, 2023 for corresponding application PCT/US2022/040472.

(Continued)

*Primary Examiner* — Matthew M Barker
(74) *Attorney, Agent, or Firm* — Bachman & LaPointe, P.C.

(57) ABSTRACT

An optics system includes a convex catching mirror located within respect to the concave primary mirror to form an optical path for a field of view. A conical volume is formed with respect to the concave primary mirror and the convex catching mirror, the optical path not obstructed by the conical volume. A component within the conical volume.

12 Claims, 3 Drawing Sheets

(56) References Cited

U.S. PATENT DOCUMENTS

| | | | | |
|---|---|---|---|---|
| 5,365,746 A * | 11/1994 | Warner | ............... | F25B 9/02 |
| | | | | 62/51.2 |
| 8,436,283 B1 | 5/2013 | Tournes et al. | | |
| 2005/0180026 A1* | 8/2005 | Pohle | ............... | G02B 27/644 |
| | | | | 359/726 |
| 2012/0294001 A1 | 11/2012 | Rehn | | |
| 2021/0010783 A1 | 1/2021 | Lupo et al. | | |

FOREIGN PATENT DOCUMENTS

| | | |
|---|---|---|
| EP | 0079684 A2 | 5/1983 |
| EP | 2792991 A2 | 10/2014 |
| WO | 2012005781 A2 | 1/2012 |
| WO | 2013167236 A1 | 11/2013 |

OTHER PUBLICATIONS

History of the Electro-Optical Guided Missiles, Edited by Hpasp, Version: 1.01, Oct. 15, 2016.
Electro-Optical System (Part I), Aircraft 101, Feb. 22, 2017, https://basicsaboutaerodynamicsandavionics.wordpress.com/2017/02/22/electro-optical-systems/.
Partial International Search Report Dated Nov. 21, 2022 for corresponding application PCT/US2022/040472.

* cited by examiner

COMPONENT PACKAGING FOR CENTRALLY OBSCURED OPTICAL SYSTEM

BACKGROUND

The present disclosure relates to an optical system, and more particularly to a seeker head with an optical system within which a component is packaged.

Centrally obscured optical systems are common in both defense and commercial applications. Increasing restrictions to size, weight, and power have resulted in multi-bounce, centrally obscured optical systems which provide longitudinal packaging advantages.

SUMMARY

An optics system according to one disclosed non-limiting embodiment of the present disclosure includes an optical path for a field of view; a conical volume formed within an inner boundary of the optical path; and a component that fits within the conical volume.

A further embodiment of any of the foregoing embodiments of the present disclosure includes that the component comprises a multiple of components that fit within the conical volume.

A further embodiment of any of the foregoing embodiments of the present disclosure includes that the component comprises a printed circuit board.

A further embodiment of any of the foregoing embodiments of the present disclosure includes that the component comprises a multiple of printed circuit boards, each of which are circular.

A further embodiment of any of the foregoing embodiments of the present disclosure includes that the component comprises a spherical coolant vessel.

A further embodiment of any of the foregoing embodiments of the present disclosure includes that the component comprises a conical coolant vessel.

A further embodiment of any of the foregoing embodiments of the present disclosure includes a convex catching mirror located within respect to a concave primary mirror to at least partially form the optical path.

A further embodiment of any of the foregoing embodiments of the present disclosure includes that the optical path terminates with a detector sensitive within at least one of an optical, an infrared, and a thermal imaging, spectral range.

A further embodiment of any of the foregoing embodiments of the present disclosure includes that the optical path terminates with a detector that provides an input to a control system which generates steering signals that navigates a vehicle.

A further embodiment of any of the foregoing embodiments of the present disclosure includes a coolant enclosure around the detector, the coolant enclosure operable to receive a cryogenic coolant to cool the detector.

A further embodiment of any of the foregoing embodiments of the present disclosure includes an optical joint aft of the conical volume with respect to a dome through which the field of view is directed.

A further embodiment of any of the foregoing embodiments of the present disclosure includes that the field of view is articulatable by the optical joint.

A seeker head according to one disclosed non-limiting embodiment of the present disclosure includes a concave primary mirror; a convex catching mirror located within respect to the concave primary mirror to form an optical path for a field of view; a conical volume formed with respect to the concave primary mirror and the convex catching mirror, the optical path not obstructed by the conical volume; a control system that comprises a multiple of printed circuit boards located within the conical volume; and a detector that forms the terminus of the optical path, the detector provides an input to the control system which generates steering signals that navigates the vehicle.

A further embodiment of any of the foregoing embodiments of the present disclosure includes that each of the multiple of printed circuit boards are circular.

A further embodiment of any of the foregoing embodiments of the present disclosure includes an optical joint aft of the conical volume with respect to a dome through which the field of view is directed.

A further embodiment of any of the foregoing embodiments of the present disclosure includes a coolant enclosure around the detector, the coolant enclosure operable to receive a cryogenic coolant from the coolant vessel to cool the detector.

A seeker head for a vehicle according to one disclosed non-limiting embodiment of the present disclosure includes a concave primary mirror; a convex catching mirror located within respect to the concave primary mirror to form an optical path for a field of view; a conical volume formed with respect to the concave primary mirror and the convex catching mirror, the optical path not obstructed by the conical volume; a coolant vessel located within the conical volume; a detector that forms the terminus of the optical path, the detector provides an input to a control system which generates steering signals that navigates the vehicle; and a coolant enclosure around the detector, the coolant enclosure operable to receive a cryogenic coolant from the coolant vessel to cool the detector.

A further embodiment of any of the foregoing embodiments of the present disclosure includes that the coolant vessel is spherical.

A further embodiment of any of the foregoing embodiments of the present disclosure includes that the coolant vessel is conical.

A further embodiment of any of the foregoing embodiments of the present disclosure includes an optical joint aft of the conical volume with respect to a dome through which the field of view is directed.

The foregoing features and elements may be combined in various combinations without exclusivity, unless expressly indicated otherwise. These features and elements as well as the operation thereof will become more apparent in light of the following description and the accompanying drawings. It should be appreciated, however, the following description and drawings are intended to be exemplary rather than defined by the limitations within and are non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
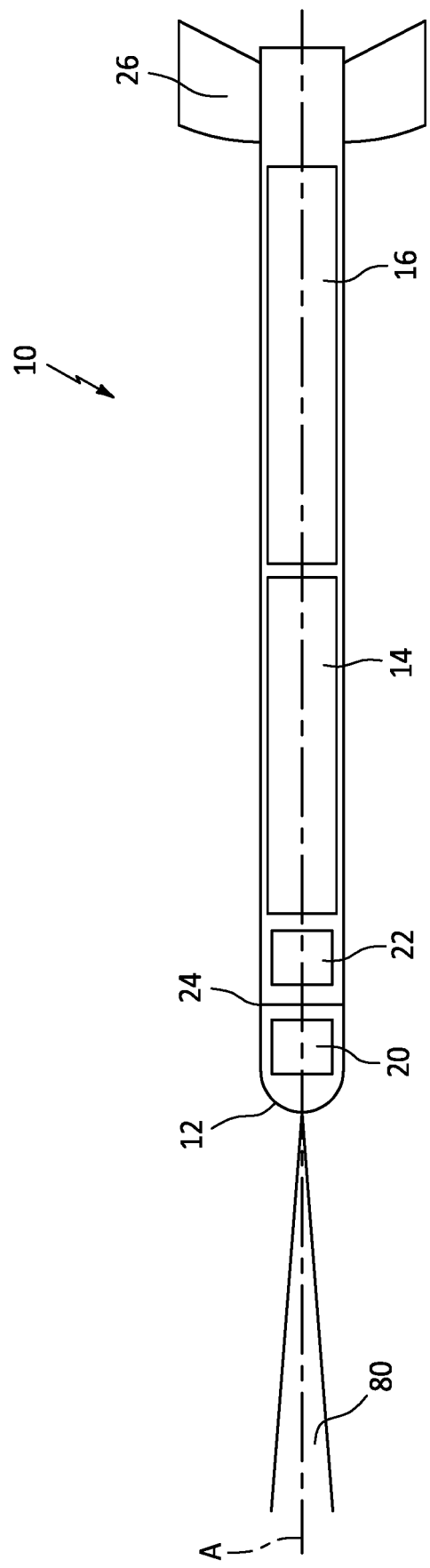
FIG. 1 is a schematic cross-sectional view of vehicle.
Figure 2:
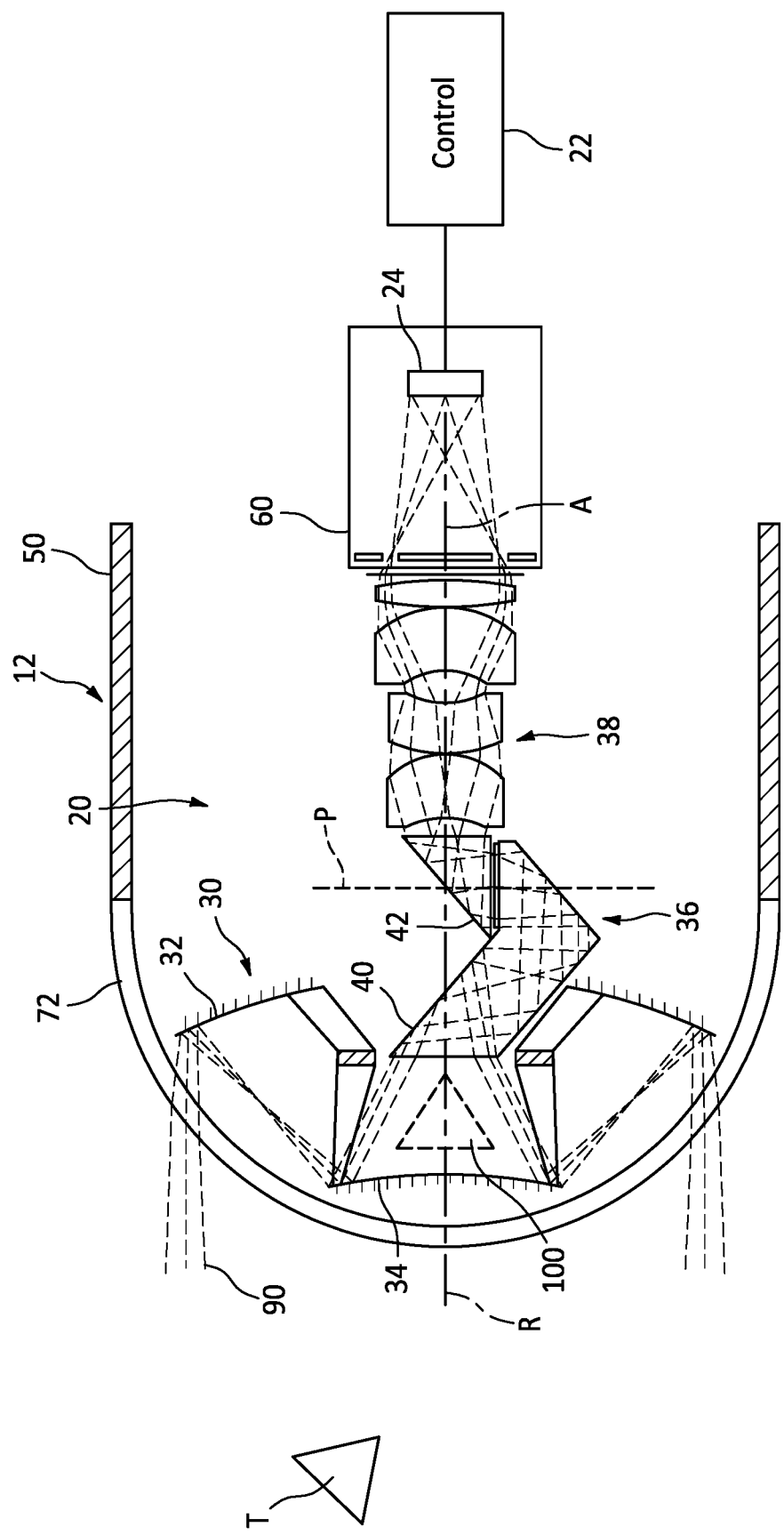
FIG. 2 is a perspective view of a seeker head of the vehicle.

FIG. 1 schematically illustrates a vehicle 10. The vehicle 10 may include a seeker head 12, an active component 14, and in some examples a motor 16. The vehicle 10 may, for example only, be an Unmanned Aerial Vehicle (UAV), spacecraft, satellite, rocket, missile, shell, or other system. The seeker head 12 may include an optics system 20 and a control system 22 that utilizes optical information from the optics system 20 and a detector 24 to generate steering signals to drive control surfaces 26 to navigate the vehicle 10.

The optics system 20 is illustrated in the disclosed embodiment as a centrally obscured optical system such as a catadioptric, Cassegrainian, or other such optical system. The optics system 20 may include input optics 30 with a concave primary mirror 32 and a convex catching mirror 34. The input optics 30 are optically connected to a detector optic 38 via an optical joint 36. The detector optic 38 provides an objective through which the object scene T is imaged onto the detector 24.

The optical joint 36 may be formed from two prism blocks 40, 42, which are designed to be movable relative to one another. The first prism block 40 is pivotable about a pitch axis P relative to the second prism block 42, and both prism blocks 40, 42 are rotatable about a roll axis R which overlays a longitudinal axis A of the vehicle 10. The first prism block 40 is fixedly connected to the input optics 30, so as to be rotatable about the pitch axis P and the roll axis R. The detector optics 38 is fixedly connected to the second prism block 42, so that it is also rotatable about the roll axis R.

The detector 24 is rigidly connected to an outer housing 50 of the seeker 12. A coolant enclosure 60 is operable to receive a cryogenic coolant such as nitrogen, or other such fluid to cool the detector 24, which may be, for example, sensitive in the optical, infrared, thermal imaging, or other such spectral range. The alignment of a field of view 80 (FIG. 1) through a dome 72 transparent to the spectral range directs the optical path of the object scene to the input optics 30 whose field of view is articulatable by the optical joint 36 and thence to the subsequent lens system of the detector optics 38 and onto the structure-fixed matrix detector 24. The detector 24 then provides an input to the control system 22 to generate the steering signals that navigates the vehicle 10.

The arrangement of the concave primary mirror 32, the convex catching mirror 34 and the optical joint 36 forms a conical volume 100 within an inner boundary of an optical path 90. The conical volume 100 does not obstruct the optical path 90 and thereby provides a volume to package a component that may otherwise have traditionally been located aft of the seeker 12.

Figure 3:
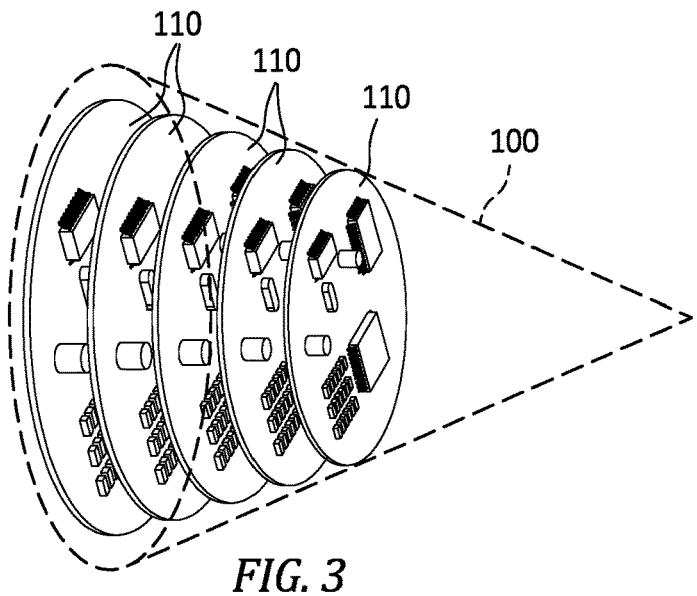
FIG. 3 is a schematic view of a conical volume within an optical path according to one disclosed non-limiting embodiment that contains a multiple of printed circuit boards.

With reference to FIG. 3, in one embodiment, a set of printed circuit boards 110 of the control system 22 may be located within the conical volume 100. In this embodiment, the printed circuit boards 110 may be circular in shape and reduce in diameter toward the optical joint 36 to fit closely within the conical volume 100.

Figure 4:
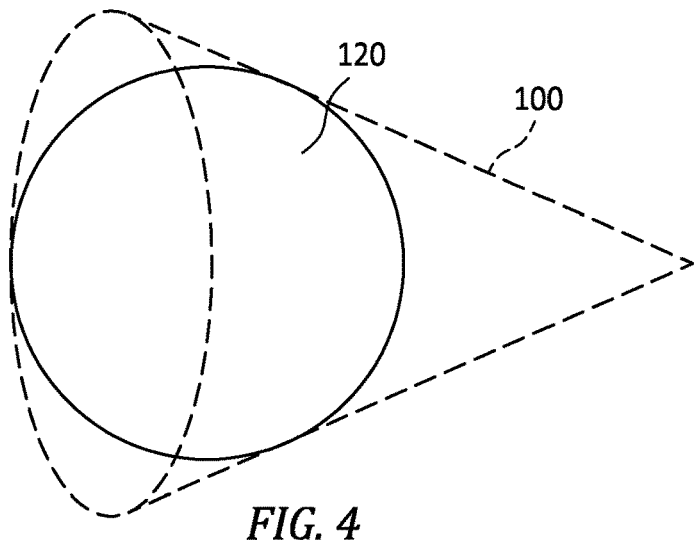
FIG. 4 is a schematic view of a conical volume within an optical path according to another disclosed non-limiting embodiment that contains a spherical coolant bottle.
Figure 5:
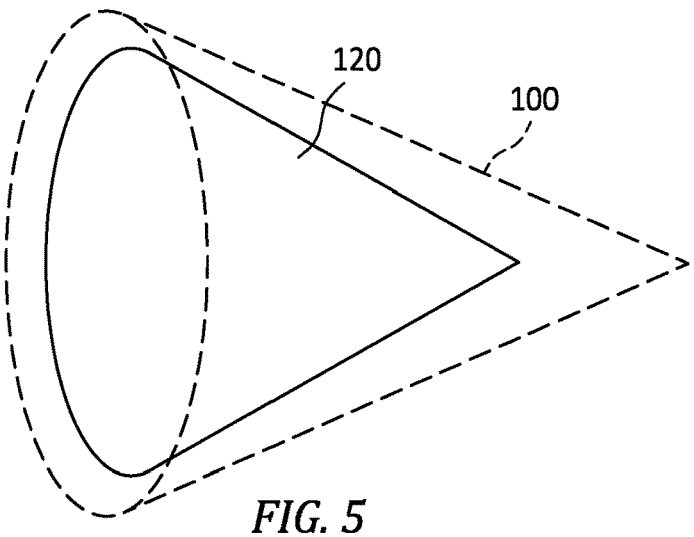
FIG. 5 is a schematic view of a conical volume within an optical path according to another disclosed non-limiting embodiment that contains a conical coolant bottle.

With reference to FIG. 4, in another embodiment, a coolant vessel 120 contains coolant for communication to the coolant enclosure 60. The coolant vessel 120 may be spherical, conical (FIG. 5) or of another shape that fits within the conical volume 100.

Usage of the conical volume 100 frees volume elsewhere in the vehicle 10. This approach allows for a seeker to be packaged in less volume to provide, for example, an increased length rocket motor, additional electronics, and/or an overall shorter vehicle.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. An optics system, comprising:
a convex catching mirror located with respect to a concave primary mirror to define an optical path for a field of view, wherein the optical path terminates with a detector;
a conical volume formed within an inner boundary of the optical path such that the optical path is not obstructed by the conical volume; and
a component that fits within the conical volume, wherein the component comprises a coolant vessel for storing a cryogenic coolant, and the coolant vessel is within the conical volume.

2. The optics system as recited in claim 1, wherein the coolant vessel comprises a spherical coolant vessel.

3. The optics system as recited in claim 1, wherein the coolant vessel comprises a conical coolant vessel.

4. The optics system as recited in claim 1, wherein the optical path terminates with a detector sensitive within at least one of an optical, an infrared, and a thermal imaging, spectral range.

5. The optics system as recited in claim 4, wherein the detector provides an input to a control system which generates steering signals that navigates a vehicle.

6. The optics system as recited in claim 5, further comprising a coolant enclosure around the detector, the coolant enclosure operable to cool the detector.

7. The optics system as recited in claim 6, further comprising an optical joint aft of the conical volume with respect to a dome through which the field of view is directed.

8. The optics system as recited in claim 7, wherein the field of view is articulatable by the optical joint.

9. A seeker head for a vehicle, comprising:
a concave primary mirror;
a convex catching mirror located with respect to the concave primary mirror to form an optical path for a field of view;
a conical volume formed with respect to the concave primary mirror and the convex catching mirror, the optical path not obstructed by the conical volume;
a coolant vessel located within the conical volume;
a detector that forms the terminus of the optical path, the detector provides an input to a control system which generates steering signals that navigates the vehicle; and
a coolant enclosure around the detector, the coolant enclosure operable to receive a cryogenic coolant from the coolant vessel to cool the detector.

10. The seeker head as recited in claim 9, wherein the coolant vessel is spherical.

11. The seeker head as recited in claim 9, wherein the coolant vessel is conical.

12. The seeker head as recited in claim 9, further comprising an optical joint aft of the conical volume with respect to a dome through which the field of view is directed.

* * * * *